(12) United States Patent
Sato et al.

(10) Patent No.: US 7,290,639 B2
(45) Date of Patent: Nov. 6, 2007

(54) METHOD FOR MANUFACTURING SPEAKER-USE CENTER CAP

(75) Inventors: Seiya Sato, Yamagata (JP); Hiroyuki Kobayashi, Yamagata (JP)

(73) Assignees: Pioneer Corporation, Tokyo (JP); Tohoku Pioneer Corporation, Yamagata (JP)

( * ) Notice: Subject to any disclaimer, the term of this patent is extended or adjusted under 35 U.S.C. 154(b) by 170 days.

(21) Appl. No.: 11/129,380

(22) Filed: May 16, 2005

(65) Prior Publication Data

US 2005/0257998 A1    Nov. 24, 2005

(30) Foreign Application Priority Data

May 18, 2004    (JP)    ............................ P2004-148385

(51) Int. Cl.
G10K 13/00     (2006.01)
H04R 7/10      (2006.01)
B29C 45/04     (2006.01)
B29C 45/14     (2006.01)

(52) U.S. Cl. ...................... 181/167; 264/275; 264/277; 264/271.1; 264/272.16

(58) Field of Classification Search ................ 181/167; 264/272.16, 271.1
See application file for complete search history.

(56) References Cited

U.S. PATENT DOCUMENTS 5,837,172 A * 11/1998 Pritchard et al. .......... 264/46.4
6,274,074 B1 * 8/2001 Monie ........................ 264/255
6,475,424 B1 * 11/2002 van Manen ................. 264/513
2005/0248058 A1 * 11/2005 Takayama et al. .......... 264/275
2005/0253298 A1 * 11/2005 Takayama et al. ...... 264/272.16
2005/0253299 A1 * 11/2005 Takayama et al. ...... 264/272.16

FOREIGN PATENT DOCUMENTS

| JP | 7-111695 | | 4/1995 |
|----|----------|---|--------|
| JP | 2000-004496 A | * | 1/2000 |
| JP | 2003-52100 | | 2/2003 |

* cited by examiner

*Primary Examiner*—Lincoln Donovan
*Assistant Examiner*—Jeremy Luks
(74) *Attorney, Agent, or Firm*—Drinker Biddle & Reath LLP

(57) ABSTRACT

A method is for manufacturing a speaker-use center cap provided with a first cap member layer of synthetic resin and a second cap member layer layered in intimate contact with the first cap member layer and made of a material different from that of the first cap member layer. The method includes: a pre-molding step of attaching a non-molded sheet-like material which is a raw material of the second cap member layer to a mating surface of one of die parts of an injection molding die and thereafter closing the injection molding die to apply a predetermined cap shape to the sheet-like material; and an injection molding step of injecting the synthetic resin material into the injection molding die closed by the pre-molding step to form the first cap member layer to be intimate contact with the second cap member layer.

5 Claims, 11 Drawing Sheets

METHOD FOR MANUFACTURING SPEAKER-USE CENTER CAP

The present disclosure relates to the subject matter contained in Japanese Patent Application No. 2004-148385 filed on May 18, 2005, which is incorporated herein by reference in its entirety.

BACKGROUND OF THE INVENTION

1. Field of the Invention

The present invention relates to a method for manufacturing a center cap for use in a speaker (hereinafter referred to as a speaker-use center cap), and more particularly to a method for manufacturing a center cap for use in a speaker in a multi-layer structure including a first cap member layer of synthetic resin molded in a predetermined shape by injection molding and a second cap member layer (skin layer) layered or stacked in intimate contact on the first cap member layer and made of a different material from the first cap member layer.

2. Description of the Related Art

In an electrodynamic speaker, which produces sound through amplitude-vibration of a diaphragm by a magnetic circuit, an opening is formed at the center of the diaphragm to secure a cylindrical voice coil bobbin passed through a magnetic gap of the magnetic circuit.

In order to prevent invasion of an extraneous material such as dust from the opening at the center of the diaphragm into the magnetic gap, a center cap is put on the vicinity of the center of the diaphragm of the speaker so that it stops or closes the opening to which the voice coil bobbin is attached.

Since such a center cap is amplitude-driven integrally to the diaphragm, it is required to have various physical properties in order to prevent the acoustic vibrating characteristic of the diaphragm from being reduced.

Concretely, the center cap is required to have the is physical properties similar or identical to those of the diaphragm, i.e. large specific modulus (E/p) or specific bending modulus $(E/p^3)$, suitable internal loss, endurance to mechanical fatigue and good weatherability. Further, in recent years, moisture resistance is also an important property for mainly a vehicle application.

In order to satisfy these demands, as the material for the center cap, metal, ceramics, synthetic resin, synthetic fiber, and natural cellulose fiber have been proposed. In recent years, various raw materials such as a microbe cellulose fiber made by biotechnology have been also proposed. The materials thus proposed have been machined into a predetermined cap shape by various machining techniques.

However, each raw material has its own property. The raw materials proposed have merits and demerits from the standpoint of view of the physical property of the center cap.

Therefore it is actually difficult to cause the center cap formed of a single material to exhibit many physical properties required as the center cap in good balance.

For example, "paper center cap" using the cellulose fiber such as wooden pulp as the raw material is relatively right in weight, and has an appropriate elasticity and internal loss. The paper center cap presented merits of is being manufactured by various techniques and of high freedom of design, but presented demerits of difficulty of assuring the waterproof and of providing high elasticity to ensure high input endurance.

On the other hand, the synthetic-resin center cap or metallic center cap has merits of easiness of assuring the waterproof and of providing the high elasticity to ensure high input endurance, but demerits of a high density and small internal loss (although some resins have large internal loss). Therefore, the synthetic-resin center cap or metallic center cap is not optimum as the center cap put on the diaphragm for a low-to-midi range or all bands which requires light weight and high rigidity.

In view of the above circumstances, it has been proposed to provide the center cap with a good balance in the physical properties by adopting a multi-layer structure consisting of a plurality of raw materials with different physical properties to compensate for the demerits of the individual raw materials.

FIG. 1 shows an example of such a speaker-use center cap.

A speaker-use center cap 1 illustrated herein has a double layer structure consisting of a first cap member layer 3 made of synthetic resin molded in a predetermined shape by injection molding and a second cap member layer (skin layer) 5 layered in intimate contact on the first cap member layer 3 and made of a different material from the first cap member layer 3.

By compensating for the demerit of e.g. woven cloth of aramid fiber used as a raw material of the second cap member layer 5 by the characteristic of the resin layer, the center cap having various physical properties in good balance can be obtained.

Meanwhile, as a method for manufacturing such a speaker-use center cap 1 in a multi-layer structure, there has been proposed a method in which after the first cap member layer 3 and the second cap member layer 5 have been individually made, both layers are integrated using e.g. adhesive as required (e.g. see JP-A-2003-052100) or another method in which with the second cap member layer 5 having been previously molded in a predetermined size/shape by a separate press molding machine, the second cap member layer 5 thus molded is insert-molded in molding the first cap member layer 3 so that it is integrated to the first cap member layer 3 (e.g. see JP-A-7-111695).

SUMMARY OF THE INVENTION

However, the above conventional method has a problem that the number of manufacturing steps is increased because of the step of independently molding the second cap member layer 5, thus increasing the production cost.

Further, when the second cap member layer 5 molded is set in a die for injection-molding the first cap member layer 3 (hereinafter referred to as an injection-molding die), or when the first cap member layer 3 and the second cap member layer 5 which have been individually made are stacked, it was difficult to provide uniform contact over the entire region of a stacking plane because of a fine size error therebetween and was impossible to ensure a uniform physical property over the entire region of the center cap, thus giving possibility of occurrence of changes in the acoustic characteristic.

Further, some recent speakers have a logotype printed on the diaphragm or center cap. However, in the case of the center cap manufactured by the conventional method described above, if the second cap member layer 5 serving as a surface layer is made of woven cloth, ruggedness due to a weaving structure remains on the printing surface. This makes it difficult to make the printing with high accuracy. Thus, the printing will be limited to the case where the second cap layer 5 is made of a film-like material with no ruggedness.

Problems that the present invention intends to solve are the problems involved in the above conventional technique, for example, a problem of an increase in cost due to the increase in the number of manufacturing steps, a problem of partial fluctuation in intimate contact due to a size error between the first cap member layer and the second cap member layer, thus leading to a fluctuating vibrating characteristic, limiting of the material of the surface layer in the case where printing is made on the cap surface.

According to one aspect of the invention, there is provided a method for manufacturing a speaker-use center cap in a multi-layer structure provided with a first cap member layer of synthetic resin molded in a predetermined shape by injection molding and a second cap member layer layered in intimate contact with the first cap member layer and made of a material different from that of the first cap member layer, the method including: a pre-molding step of attaching a non-molded sheet-like material which is a raw material of the second cap member layer to a mating surface of one of die parts of an injection molding die and thereafter closing the injection molding die to apply a predetermined cap shape to the sheet-like material; and an injection molding step of injecting the synthetic resin material into the injection molding die closed by the pre-molding step to form the first cap member layer to be intimate contact with the second cap member layer.

DETAILED DESCRIPTION OF THE PREFERRED EMBODIMENTS

Figure 1:
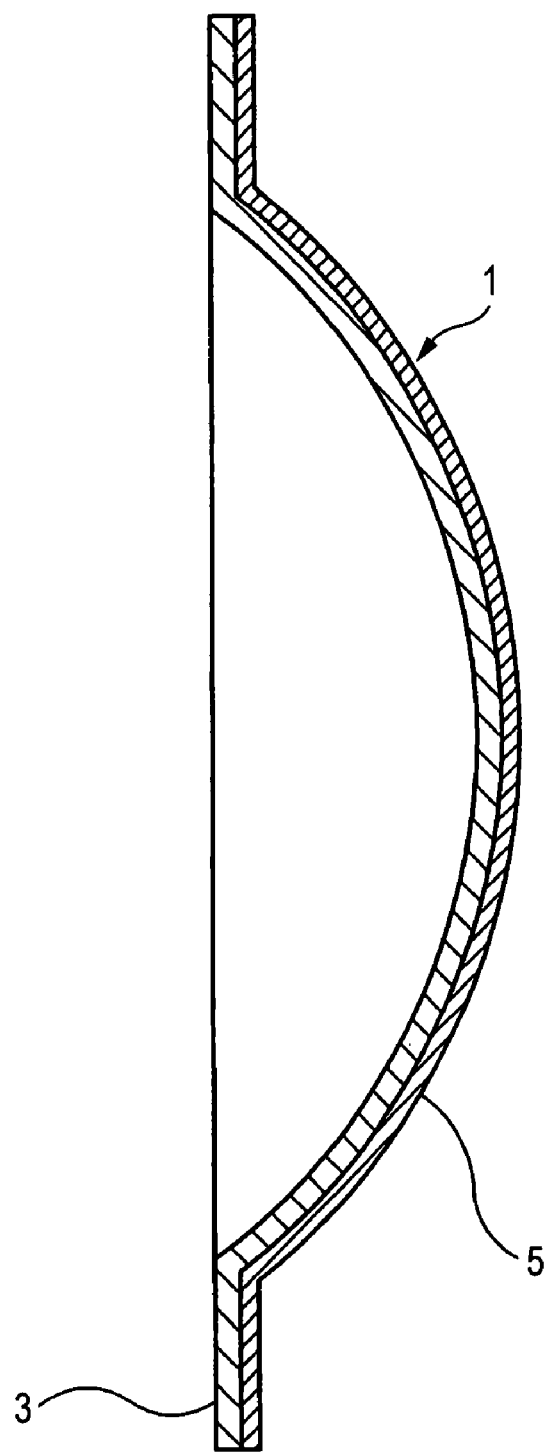
FIG. 1 is a longitudinal sectional view showing a speaker-use center cap in a multi-layer layer structure.

Now referring to the drawings, a detailed explanation will be given of various preferred embodiments of a method for manufacturing a speaker-use center cap according to this invention.

Figure 2:
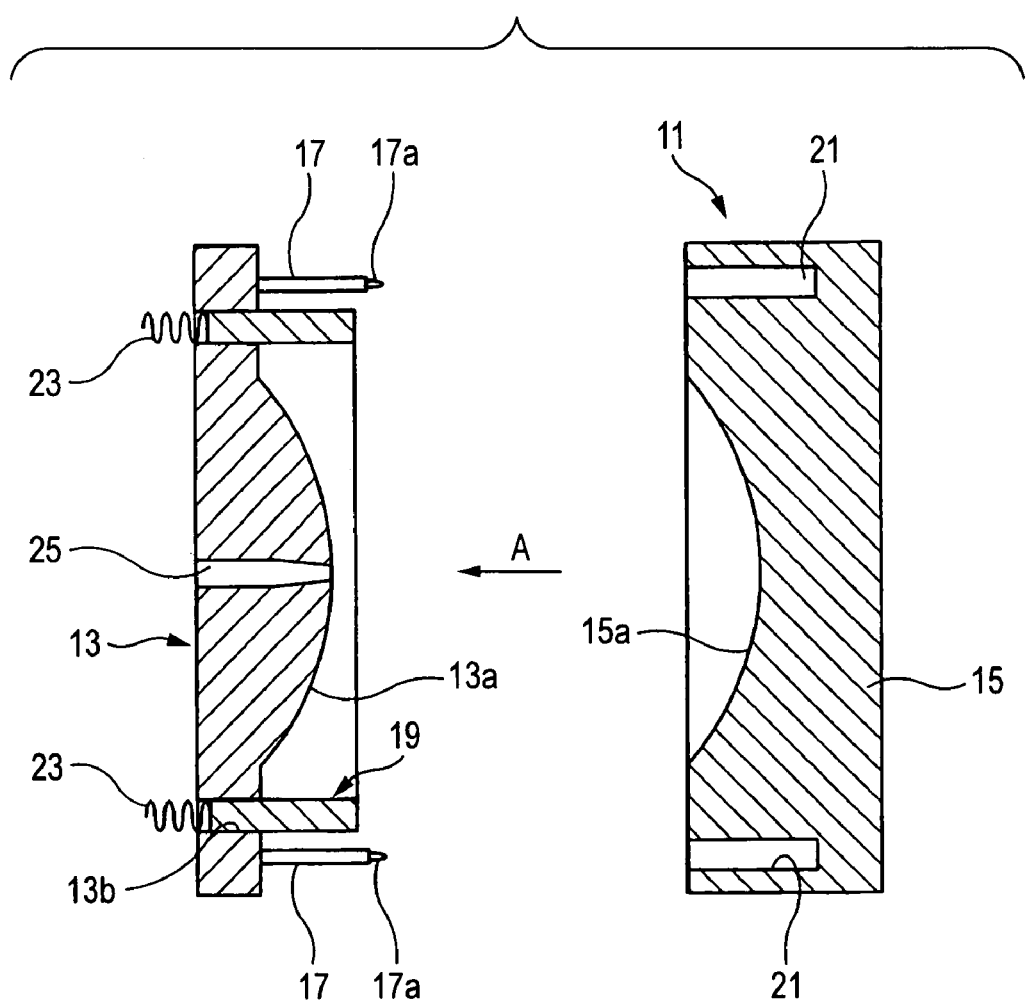
FIG. 2 is a longitudinal sectional view when an injection molding die is opened which is used in an embodiment of a method for manufacturing a speaker-use center cap according to this invention.
Figure 3:
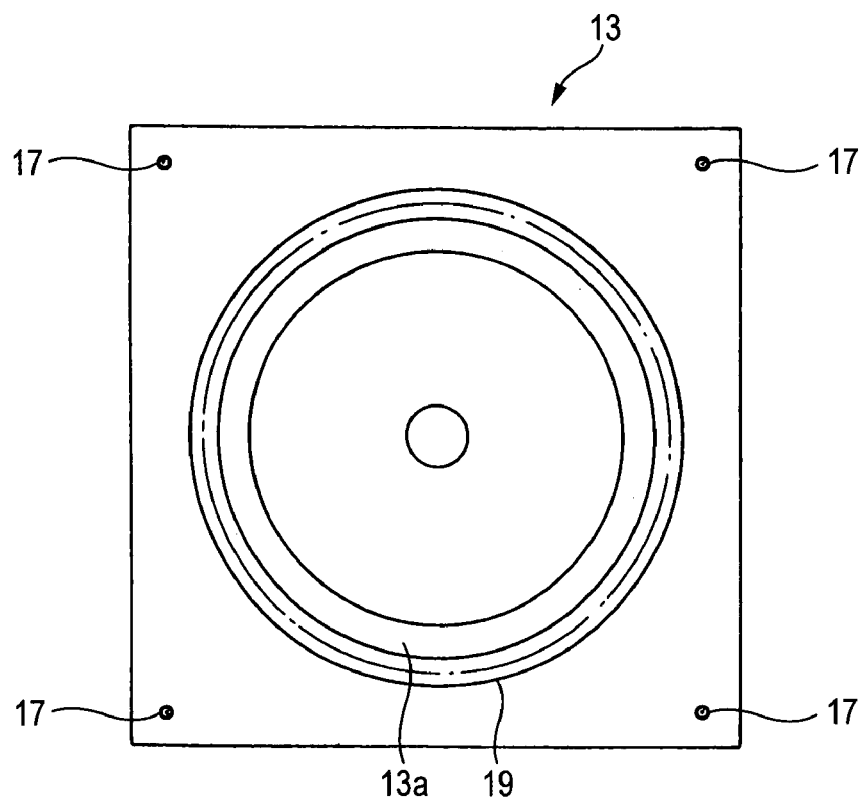
FIG. 3 is a plan view when viewed in arrow A in FIG. 2.

FIGS. 2 and 3 show an injection-molding die used in an embodiment of a method for manufacturing a speaker-use center cap according to this invention.

An injection-molding die 11 is used for manufacturing the speaker-use center cap 1 shown in FIG. 1. The injection-molding die 11 consists of a male die part (also simply referred to as a male die) 13 having a bowl or dome-shaped projection 13a formed along the contour of the surface of the speaker-use center cap 1 and a female die part (also simply referred to as a female die) 15 having a bowl or dome-shaped concavity 15a corresponding to the dome-shaped projection 13a.

One of the male die 13 and the female die 15 is movably supported by a guide member not shown so that the injection molding die 11 can be opened and closed.

In the embodiment, the male die 13 is provided with four sheet positioning pins 17 having tip needles 17a penetrating the outer edge of a sheet-like material (described later) to secure it and a sheet pressing-down member 19 for pressing the sheet-like material positioned by the sheet positioning pins 17 to prevent wrinkles from occurring in the sheet-like material.

The sheet positioning pins 17, as seen from FIG. 3, are provided vertically upright at four corners of a mating surface of the male die 13 opposite to the female die 15.

When the dies are closed, in order that these sheet positioning pins 17 do not interfere with the female die 15, relief holes 21 which these sheet positioning pins 17 pass, respectively are provided in the mating surface of the female die 15.

As seen from FIG. 3, the sheet pressing-down member 19, which is cylindrical with its center axis aligning with that of the dome-shaped projection 13a, is supported by a guiding hole 13b formed in the male die 13 so that it is slidable toward the female die 15 and also urged toward the female die 15 by a urging means (spring) 23 arranged at its rear of the male die 13.

The male die 13 has a gate 25 penetrating at its center, which is used for injecting synthetic resin.

Next, an explanation will be given of the procedure of manufacturing the speaker-use center cap 1 shown in FIG. 1 using the injection-molding die 11 described above.

Figure 4:
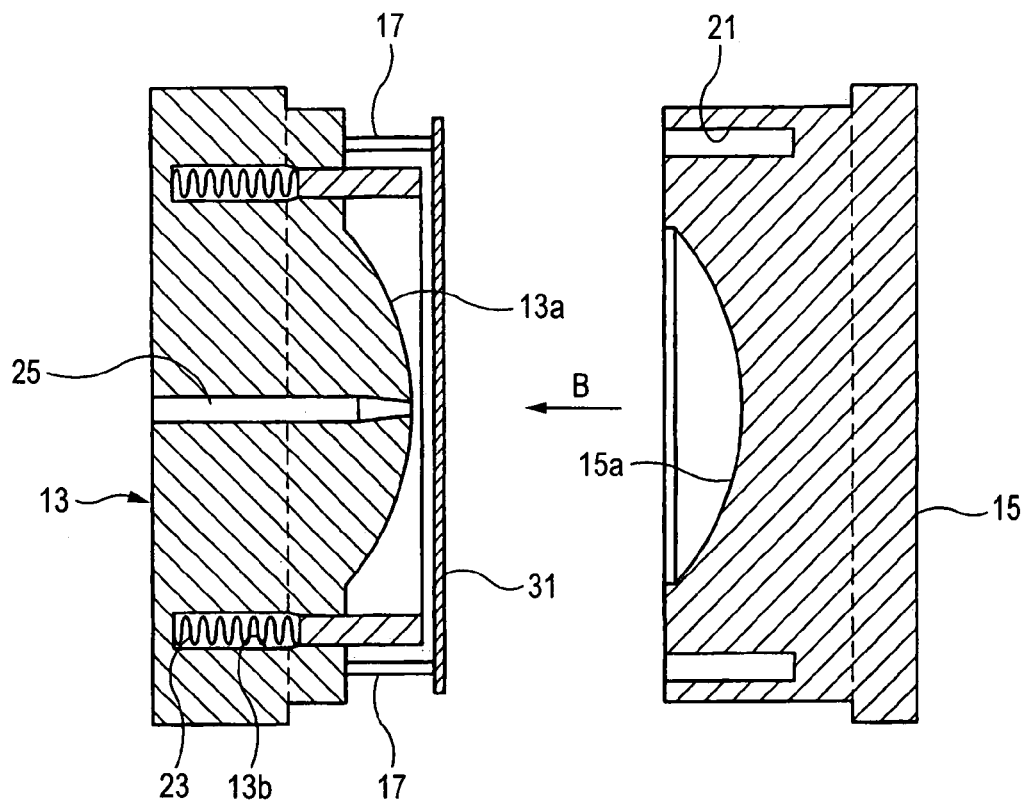
FIG. 4 is a view for explaining the state where a non-molded sheet-like material which is a raw material of the second cap member layer is attached to one part of an injection molding die shown in FIG. 2.
Figure 5:
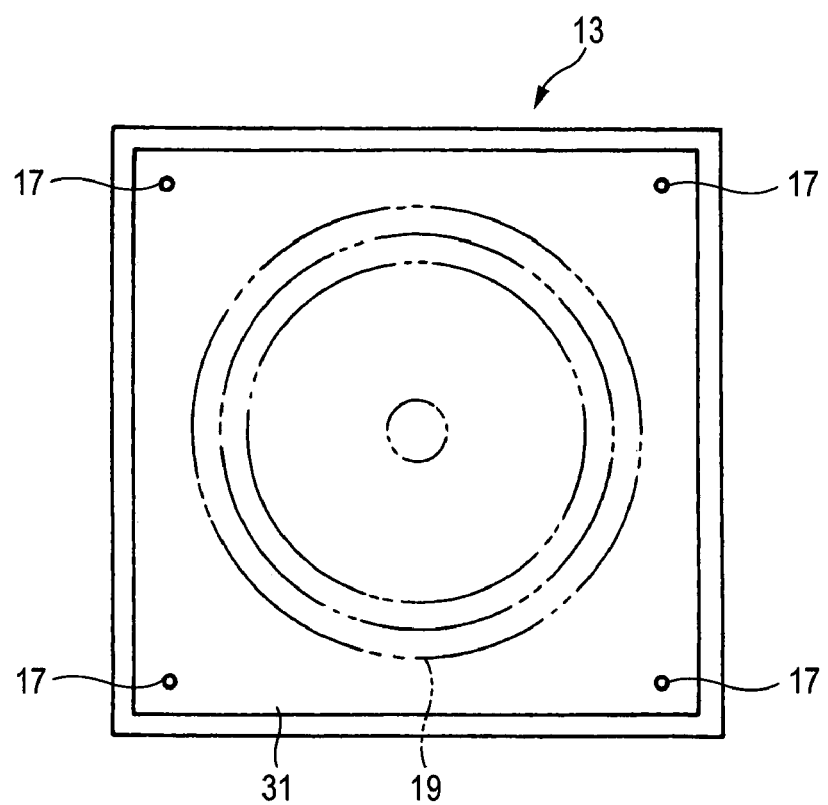
FIG. 5 is a plan view when viewed in arrow A in FIG. 4.

First, as seen from FIG. 4, with the respective die parts 13, 15 having been moved to open the injection-molding die 11, anon-molded sheet-like material 31, which is the raw material of the second cap member layer, is attached to the sheet positioning pins 17 of the one die part 13.

Next, a pre-molding step will be executed. In the pre-molding step, as seen from FIG. 6, by closing the injection-molding die 11, the sheet-like material 31 is sandwiched by the dome-shaped projection 13a and the dome-shaped concavity 15a so that it is press-molded. Thus, the sheet-like material 31 is given a predetermined dome-shaped cap shape.

In an injection molding step to be executed subsequently, from the gate 25 of the one die part 13, a synthetic resin material 26 which serves as the first cap member layer 3 is injected into the injection molding die 11 at predetermined temperature and pressure, thereby making the first cap member layer 3. In this case, the following step may be added to the injection molding step. A die gap S for facilitating resin flow is formed by moving the one die part 13 as shown in FIG. 7 from the die-closed state shown in FIG. 6 by a predetermined distance in a direction in which both die parts leave each other, and the injection molding die 11 is closed again on the way of injection.

Figure 8:
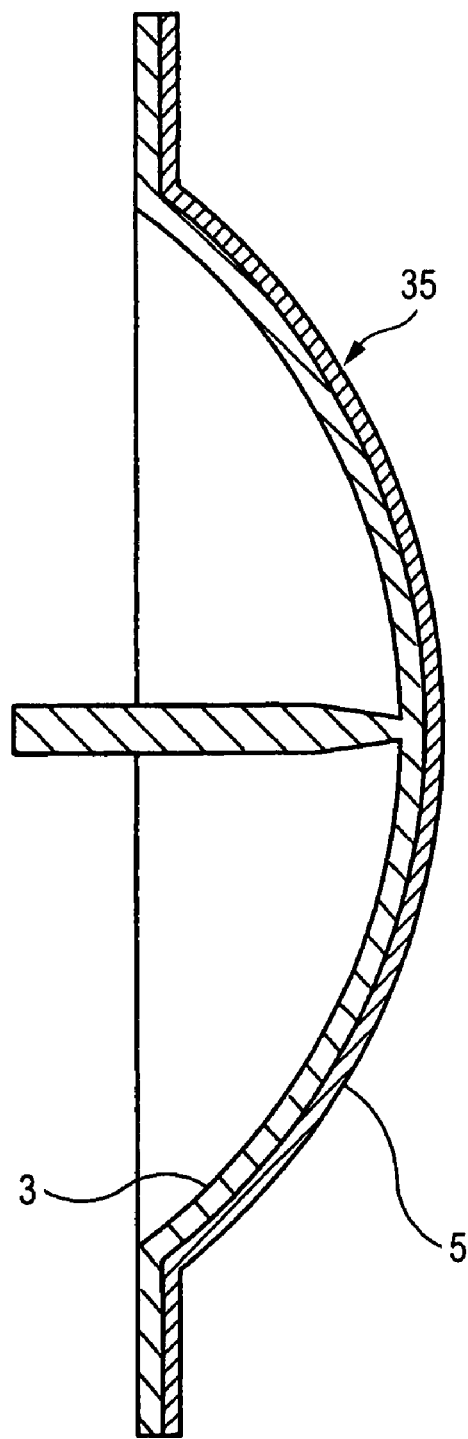
FIG. 8 is a longitudinal sectional view of a molded product manufactured by the injection molding step shown in FIG. 7.

FIG. 8 shows a molded product 35 taken out by opening the injection molding die 11 after the injection molding step has been completed.

Unnecessary part (e.g. gate traces) is cut from the molded product 35, thereby providing a speaker-use center cap 1 in a multi-layer structure in which the second cap member layer 5 is layered in intimate contact on the first cap member layer 3 as shown in FIG. 1.

Incidentally, the main component of the sheet-like material 31 may be, for example, cellulose fiber such as wooden pulp.

The synthetic resin material which constitutes the first cap member layer 3 may be, for example, a mixture of a base of olefin resin such as polypropylene with filler such as mica or carbon fiber.

In the method for manufacturing the speaker-use center cap described above, the molding of the second cap member layer 5 is not done using a dedicated press-molding device, but done through sandwiching it in the injection molding die 11 for making the first cap member layer 3 and the injection molding step for making the first cap member layer 3 is done in succession thereto. Thus, as compared with the conventional manufacturing method in which the second cap member layer 5 is independently molded in a separate manufacturing line, this invention can reduce the number of manufacturing steps, thus reducing the production cost of the center cap 1.

Further, the non-molded sheet-like material 31, after it has been provisionally molded in a predetermined shape by die closing of the injection molding die 11, is accurately press-molded in a cavity shape of the die by resin pressure and heat exerted during the injection molding. For this reason, contact failure due to size error does not occur between the first cap member layer 3 and second cap member layer 5.

Accordingly, uniform intimate contact can be obtained over the entire region of the stacking plane between the first cap member layer 3 and second cap member layer 5. By equalization of the intimate contact between the cap member layers, uniform physical property can be ensured over the entire region of the center cap. As a result, multi-layering of different materials can assure the improved physical property with no unevenness over the entire region of the center cap, thus stably realizing improvement of the acoustic characteristic.

Further, in the method for manufacturing the speaker-use center cap according to the embodiment, with the sheet-like material 31 attached to the mating side of the one die part 13 being suitably tightened by the sheet positioning pins 17 and the sheet pressing-down member 19, the die closing can be done with no wrinkle of the sheet-like material 31. This suppresses occurrence of molding failure of the sheet-like material in the pre-molding step, thus permitting the pre-molding step to be smoothly executed.

Further, in the manufacturing method according to the embodiment, after the die closing for the pre-molding step, the one die part 13 may be moved by a predetermined distance in the leaving direction so that the die gap S is formed to facilitate injection of the synthetic resin material 26. This reduces pressure of the resin flow, thereby preventing occurrence of the displacement, wrinkle, deformation of the sheet-like material 31 preliminarily is molded by the die closing.

The material of the sheet-like material 31 which constitutes the second cap member layer 5 should not be limited to that proposed in the embodiment. For example, it may be a metallic film.

Further, the sheet-like material 31 may be woven cloth of the fiber of the material different from the synthetic resin material which constitutes the first cap member layer 3. In this case, as the cloth for the sheet-like material, using an aramid fiber woven cloth of aromatic polyamide fiber having excellent mechanical strength (concretely, Kevlar K144 available from DuPont-Toray Co. Ltd), the center cap with high rigidity and light weight can be easily provided.

Figure 9:
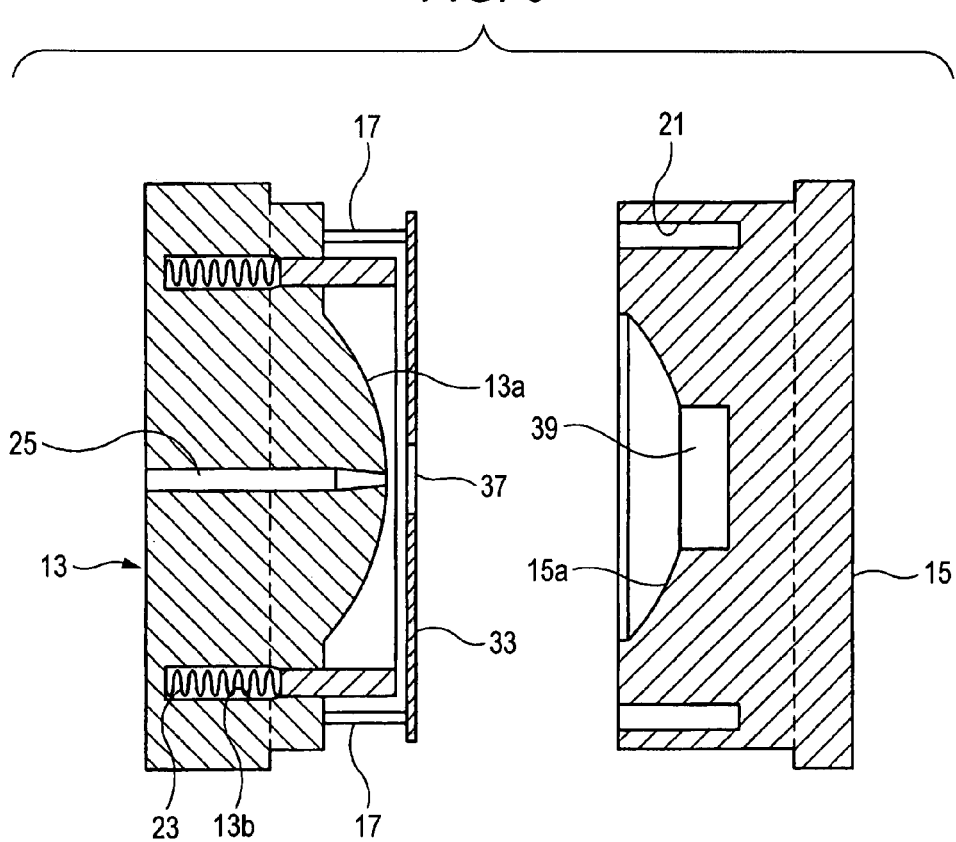
FIG. 9 is a longitudinal sectional view showing the pre-molding step according to another embodiment of the method for manufacturing a speaker-use center cap according to this invention.

FIG. 9 shows the method for manufacturing the speaker-use center cap using a sheet-like material 33 of aramid fiber cloth in order to make the second cap member layer 5.

Figure 6:
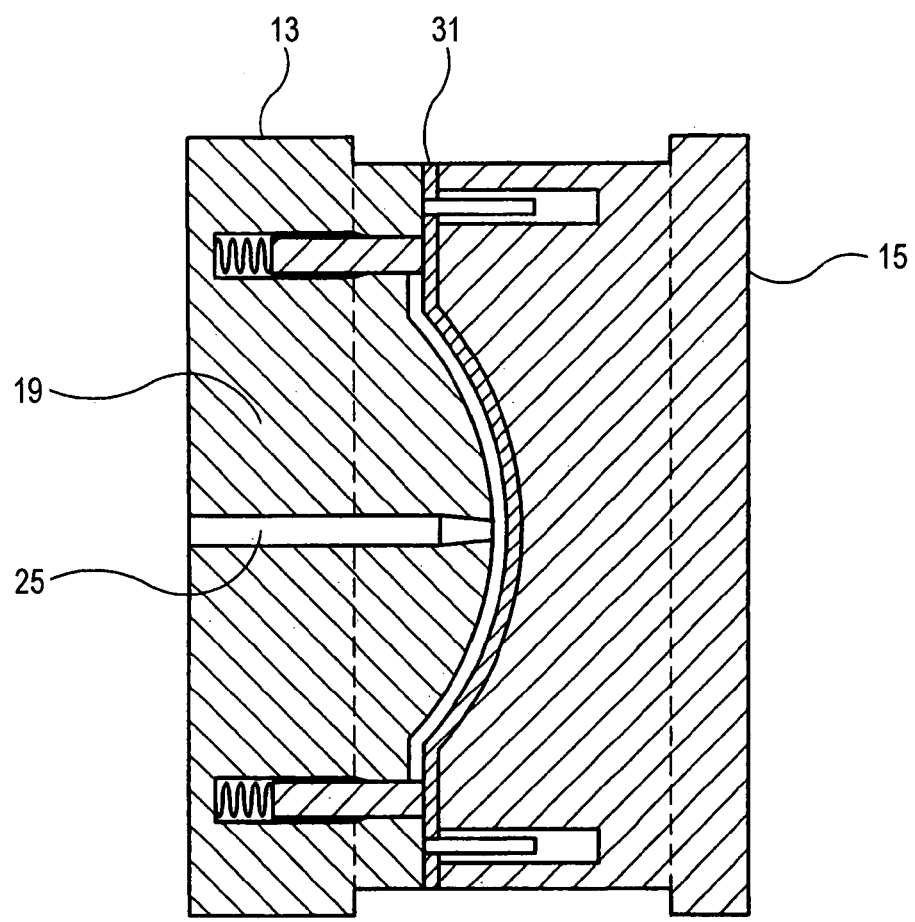
FIG. 6 is a sectional view showing the step of molding the non-molded sheet-like material in a predetermined shape in an embodiment of this invention.
Figure 7:
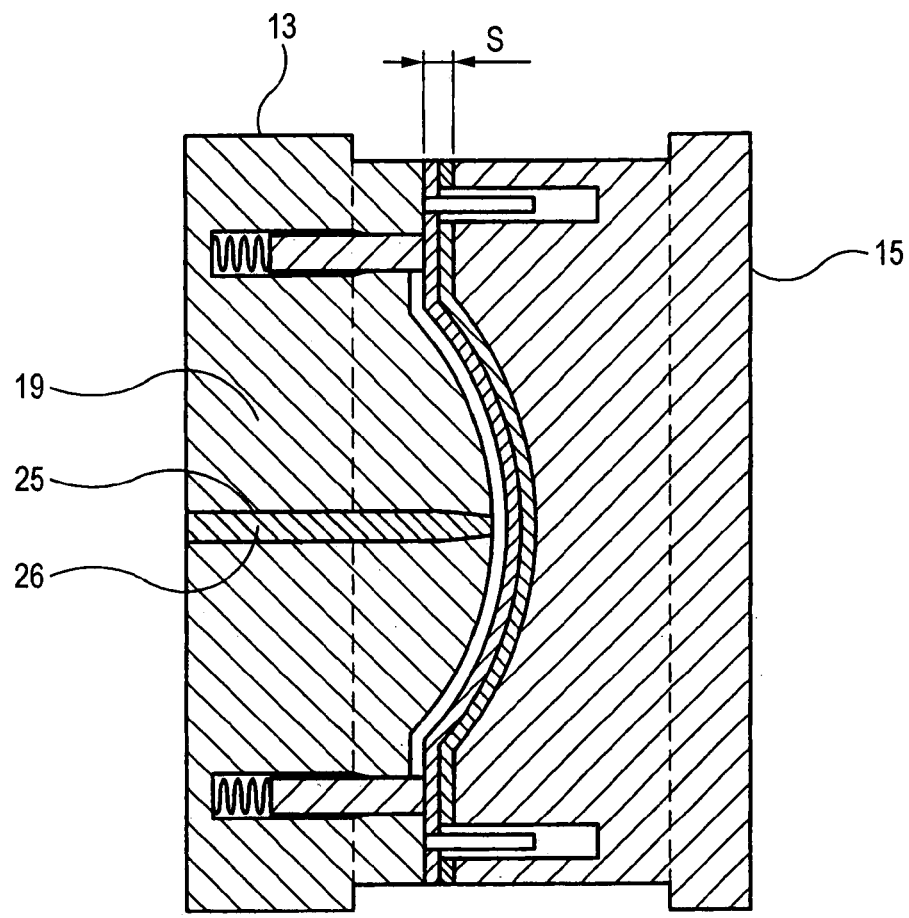
FIG. 7 is a sectional view showing the state where the synthetic resin material 26 constituting the first cap member layer is being injected into an injection molding die.

The manufacturing method according to the embodiment is basically the same as the embodiment described referring to FIGS. 4, 6 and 7.

In the embodiment, slight improvement is made by using the sheet-like material 33 of woven cloth.

Specifically, the sheet-like material 33 of woven cloth attached to the one die part 13 for the pre-molding step is provided with a connection aperture 37 which guides a part of the synthetic resin material, which is filled (charged) in the one side of the sheet-like material 33 from the gate 25 of the one die part 13 during the injection molding step, into the other side of the sheet-like material 33.

The connection aperture 37 is formed at the center of the curved cap corresponding to the opening position of the gate 25.

The female die 15 is provided with a resin reservoir 39 for spreading the synthetic resin material flowing into the other die part (female die 15) through the aperture opening 37 to the other side of the sheet-like material 33. The resin reservoir 39 is formed at the position corresponding to the connection aperture 37.

Figure 10:
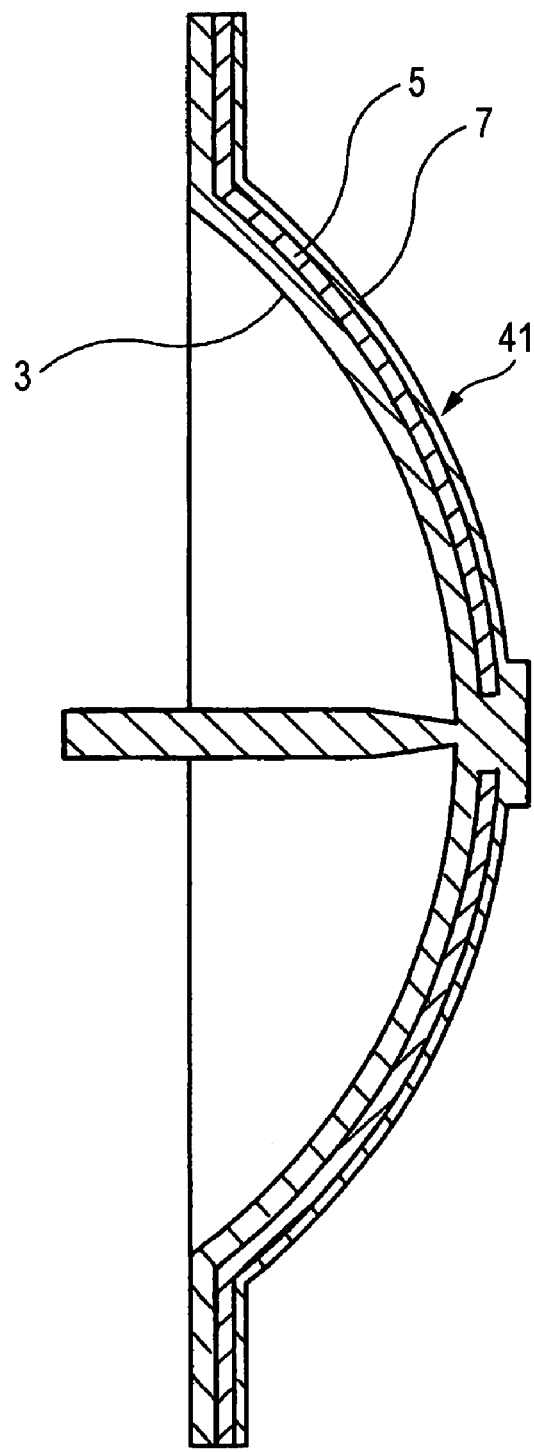
FIG. 10 is a longitudinal sectional view of a molded product manufactured by the injection molding step shown in FIG. 9.

In such a manufacturing method, a part of the synthetic resin material of the first cap member layer 3 injected during the injection molding step is spread from the one side of the second cap member layer 5 of the woven cloth over the other side thereof. Thus, as seen from FIG. 10, a molded product 41 has a structure in which a resin layer 7 plugged in the unevenness of the surface of the second cap member layer 5 is formed on the surface of the second cap member layer 5.

For this reason, even where the second cap member layer 5 is made from the woven cloth and located on the surface side of the center cap, no unevenness due to weaving structure remains on the surface. Thus the resultant surface is finished as the resin surface with no unevenness. This permits printing with high accuracy by silk printing so that the material of the surface layer for printing is not limited.

Figure 11A:
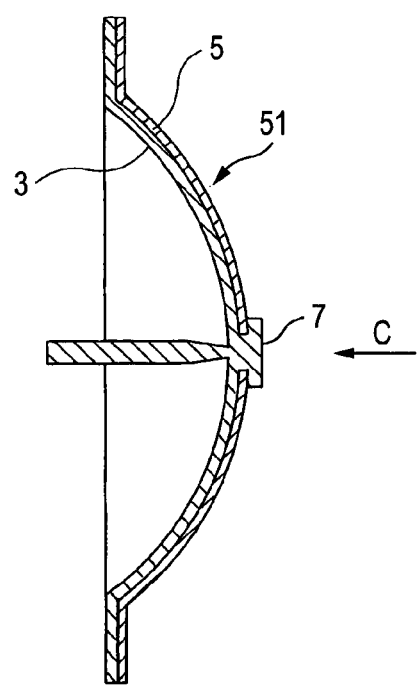
FIG. 11A is a longitudinal sectional view of a molded product with a resin layer formed at only a printing area by the injection molding step shown in FIG. 9.
Figure 11B:
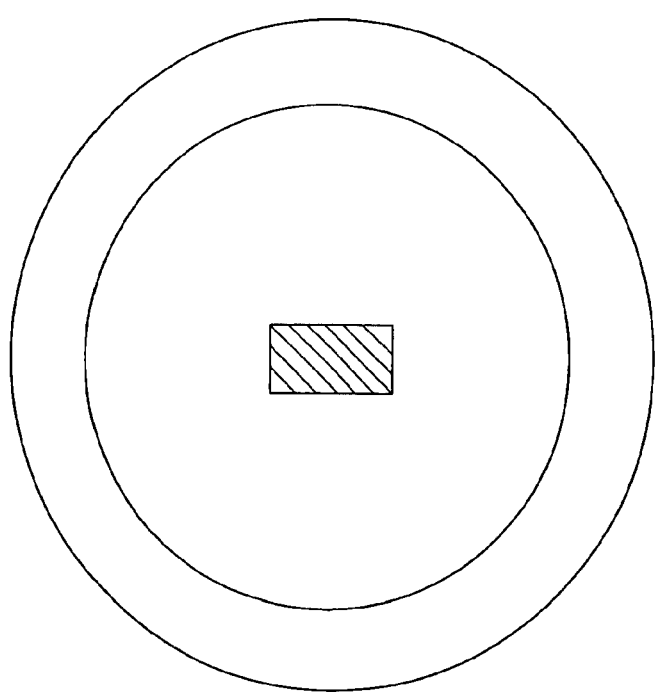
FIG. 11B is a view when viewed in arrow C.

Further, as seen from FIG. 11, a molded product 51 can be also provided in which resin injection is made at only the printing area of the surface of the second cap member layer 5 to form the resin layer 7.

Although the present invention has been shown and described with reference to the preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A method for manufacturing a speaker-use center cap in a multi-layer structure provided with a first cap member layer of synthetic resin molded in a predetermined shape by injection molding and a second cap member layer layered in intimate contact with the first cap member layer and made of a material different from that of the first cap member layer, the method comprising:

a pre-molding step of attaching a non-molded sheet-like material which is a raw material of the second cap member layer to a mating surface of one of die parts of an injection molding die and thereafter closing the injection molding die to apply a predetermined cap shape to the sheet-like material; and an injection molding step of injecting the synthetic resin material into the injection molding die closed by the pre-molding step to form the first cap member layer to be intimate contact with the second cap member layer.

2. The method according to claim 1, wherein the die part to which the sheet-like material is attached is provided with a plurality of sheet positioning pins and a sheet pressing-down member, the sheet positioning pins penetrating an outer edge of the sheet-like material to secure the sheet-like material, the sheet pressing-down member pressing the sheet-like material positioned by the sheet positioning pins to prevent wrinkles from occurring in the sheet-like material.

3. The method according to claim 1, further comprising a die-gap-forming step performed between the pre-molding step and the injection molding step, the die-gap-forming step of moving one of the die parts by a predetermined distance in a direction to open the injection molding die to form a die gap for injecting the synthetic resin material.

4. The method according to claim 1, wherein the sheet-like material includes woven cloth of a fiber of a material different from the synthetic resin material.

5. The method according to claim 4, wherein the sheet-like material is provided with a connection aperture, which guides a part of the synthetic resin material that is filled in one side of the sheet-like material during the injection molding step, into the other side of the sheet-like material.

* * * * *